United States Patent
Madhusudan

(10) Patent No.: US 12,347,823 B2
(45) Date of Patent: Jul. 1, 2025

(54) THERMALLY EFFICIENT BATTERY CELL ASSEMBLY

(71) Applicant: Textron Innovations Inc., Providence, RI (US)

(72) Inventor: Phalgun Madhusudan, Malleswaram (IN)

(73) Assignee: Textron Innovations Inc., Providence, RI (US)

(*) Notice: Subject to any disclaimer, the term of this patent is extended or adjusted under 35 U.S.C. 154(b) by 0 days.

(21) Appl. No.: 18/594,587

(22) Filed: Mar. 4, 2024

(65) Prior Publication Data

US 2024/0258556 A1      Aug. 1, 2024

Related U.S. Application Data

(62) Division of application No. 17/246,702, filed on May 2, 2021, now Pat. No. 11,935,996.

(51) Int. Cl.
    *H01M 10/00*    (2006.01)
    *H01M 10/04*    (2006.01)
    *H01M 50/166*    (2021.01)

(52) U.S. Cl.
CPC ..... *H01M 10/0431* (2013.01); *H01M 50/166* (2021.01)

(58) Field of Classification Search
CPC . H01M 10/04; H01M 50/166; H01M 10/0431
See application file for complete search history.

(56) References Cited

U.S. PATENT DOCUMENTS

| | | | |
|---|---|---|---|
| 2008/0254343 A1* | 10/2008 | Kaplin | H01M 50/325 429/61 |
| 2009/0297929 A1 | 12/2009 | Uchida | |
| 2011/0086252 A1* | 4/2011 | Phillips | H01M 50/325 29/623.2 |
| 2020/0248996 A1 | 8/2020 | Kleiser | |
| 2023/0112329 A1 | 4/2023 | Takasu | |
| 2023/0402722 A1 | 12/2023 | Eggleston | |

FOREIGN PATENT DOCUMENTS

| | | |
|---|---|---|
| JP | 2014170664 A | 9/2014 |
| JP | 2021150242 A | 9/2021 |

\* cited by examiner

*Primary Examiner* — Anca Eoff
*Assistant Examiner* — Monique M Wills
(74) *Attorney, Agent, or Firm* — Lightfoot & Alford PLLC

(57) ABSTRACT

A battery cell assembly, including a rolled cell formed from a first electrode and a second electrode rolled together about a longitudinal axis. The rolled cell includes a primary section in which the first electrode and the second electrode overlap in a radial direction from the longitudinal axis, and a first extension end extending from a first longitudinal end of the primary section and formed from a first edge section of the first electrode. The first edge section includes a first folded portion folded to contact an adjacent portion of the first edge section. The battery cell assembly further includes a first end cap coupled to the rolled cell and contacting the first folded portion.

13 Claims, 9 Drawing Sheets

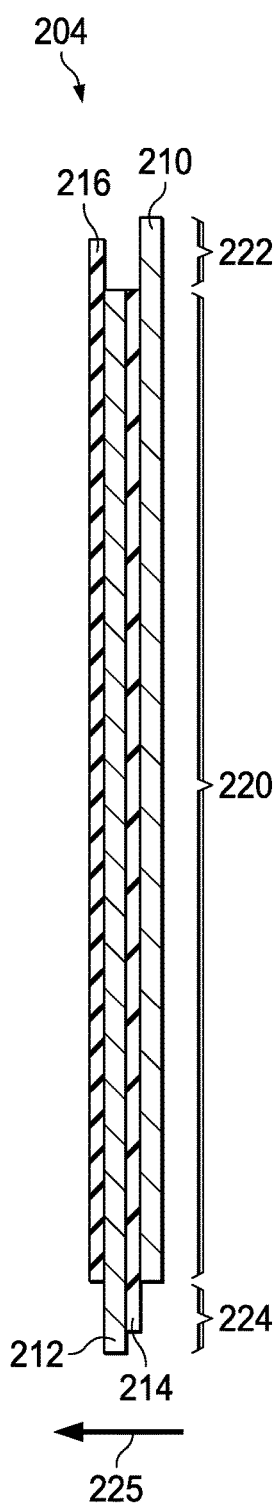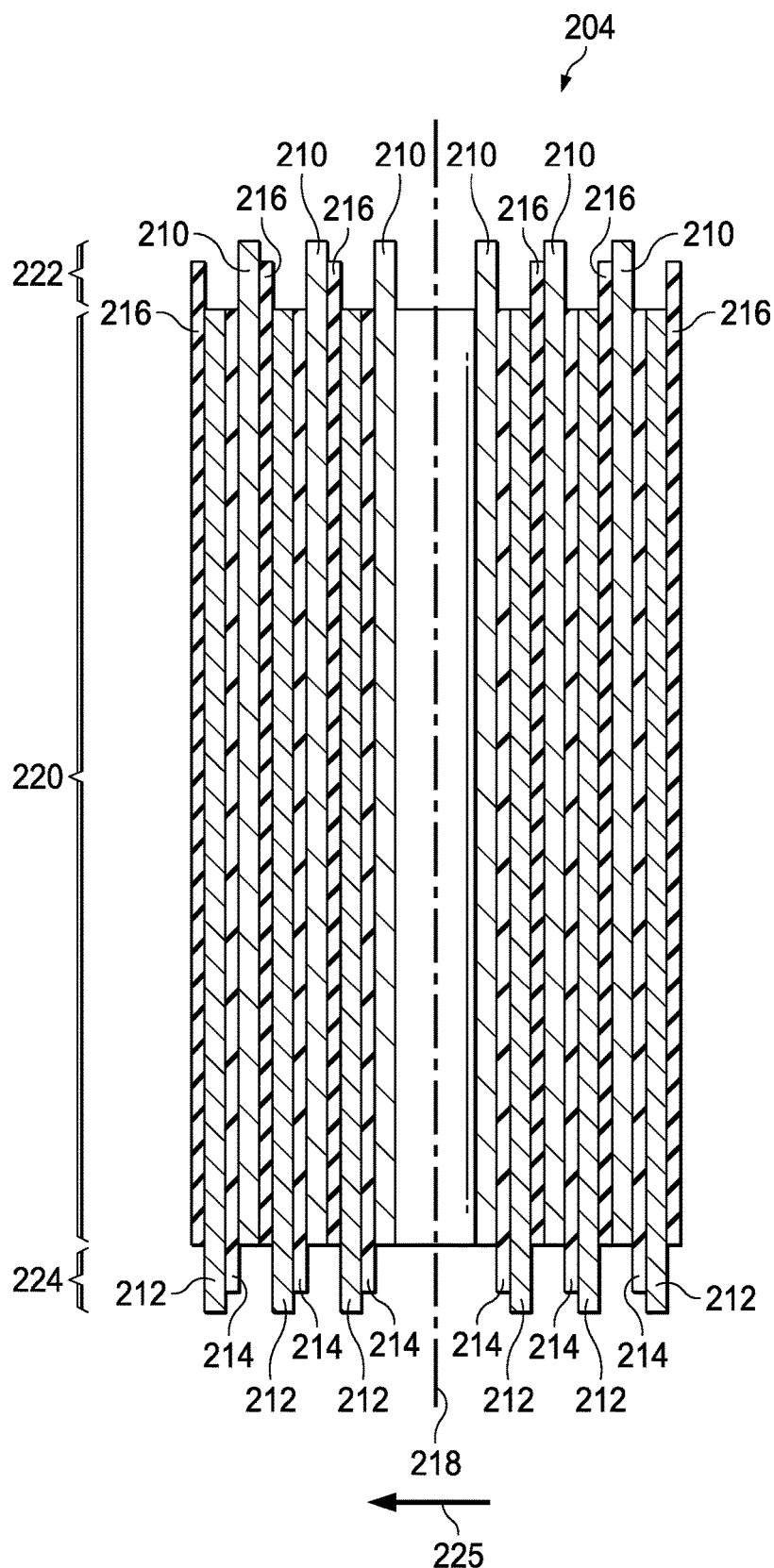
FIG. 4
FIG. 5

THERMALLY EFFICIENT BATTERY CELL ASSEMBLY

BACKGROUND

Lithium-ion batteries are becoming more prevalent as many vehicles that have traditionally been powered by combustion engines now incorporate battery-powered electric engines. Lithium-ion batteries have a lithium metal oxide cathode and a graphite anode, between which lithium ions pass. During charging, electrons are provided to the anode and lithium ions travel from the cathode to the anode to unite with the electrons. During discharging, when a load is applied to the battery, the electrons travel through the load (providing current to the load) to the cathode and the lithium ions travel back to the cathode to reunite with the electrons.

In some designs, lithium-ion batteries incorporate tabs for transferring current between an active part of the battery and the load. When large loads are applied, passing the required current through the small tab can cause batteries to overheat. Additionally, lithium-ion batteries are typically encased in a metallic jacket, which can add a significant amount of weight to the battery.

BRIEF DESCRIPTION OF THE DRAWINGS

FIG. 4 illustrates a side view of a battery cell of the battery of FIG. 2 in an unrolled state.

FIG. 5 illustrates a cutaway view of a battery cell of the battery of FIG. 2 in a rolled state.

DETAILED DESCRIPTION

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1:
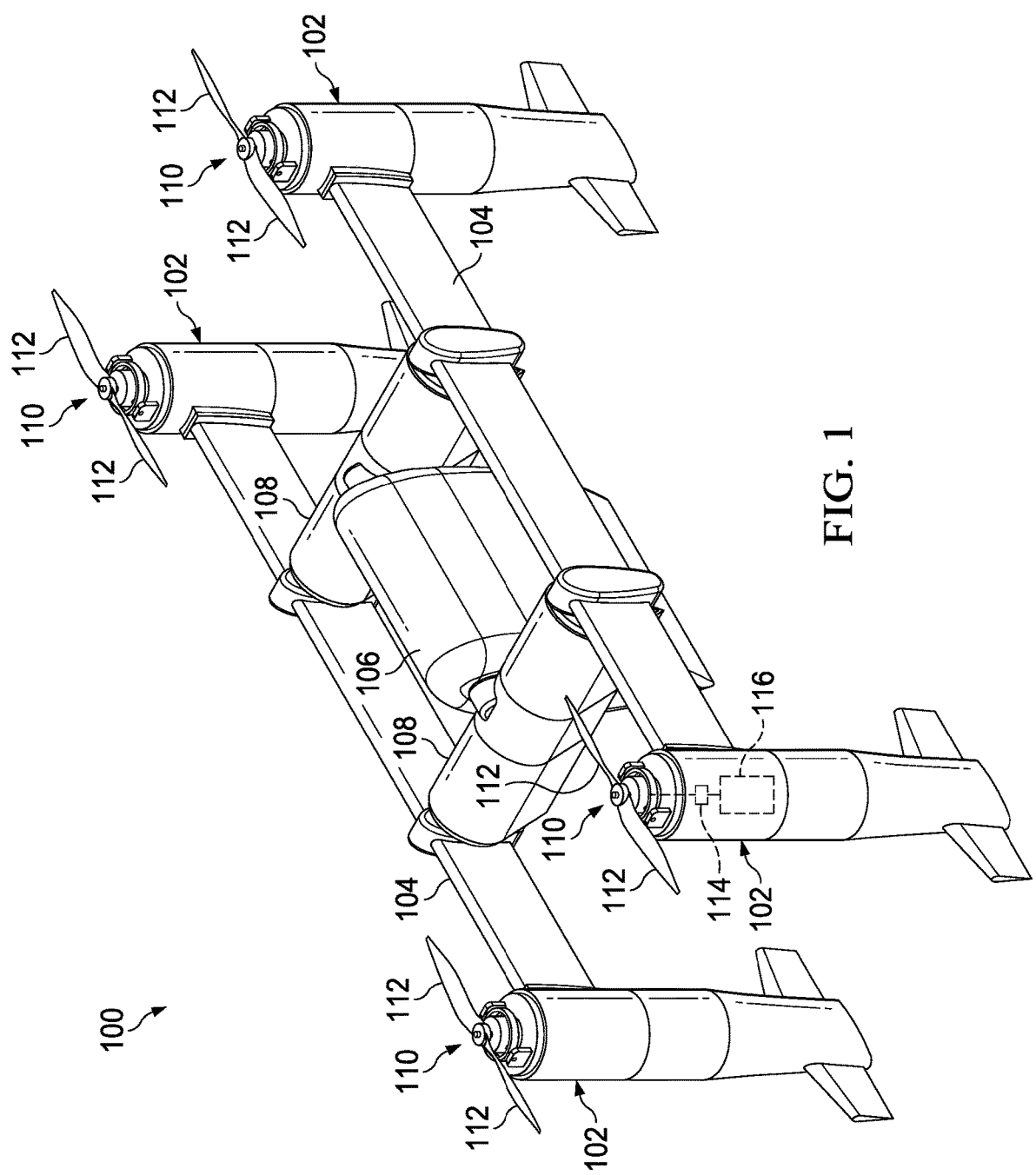
FIG. 1 illustrates an oblique view of an aircraft according to an embodiment of this disclosure.

FIG. 1 illustrates an oblique view of a tailsitter unmanned aerial vehicle ("UAV") 100 operable to transition between thrust-borne lift in a vertical takeoff and landing ("VTOL") orientation and wing-borne lift in a biplane orientation. In some embodiments, UAV 100 is a Bell Autonomous Pod Transport ("APT") aircraft. In the VTOL orientation, thrust modules 102 provide thrust-borne lift and, in the biplane orientation, thrust modules 102 provide forward thrust and the forward airspeed of UAV 100 provides wing-borne lift. Thrust modules 102 are mounted to wings 104, which generate lift responsive to forward airspeed when the UAV 100 is in the biplane orientation. Wings 104 are mounted to a payload 106 of UAV 100 by trusses 108. Each thrust module 102 includes a rotor assembly 110 with propellers 112 configured to rotate to provide thrust and direct ram air and propeller wash toward thrust module 102. Each of the thrust modules 102 includes an electric motor 114 for driving rotor assembly 110 and a battery pack 116 configured to provide electrical energy to motor 114.

Figure 2:
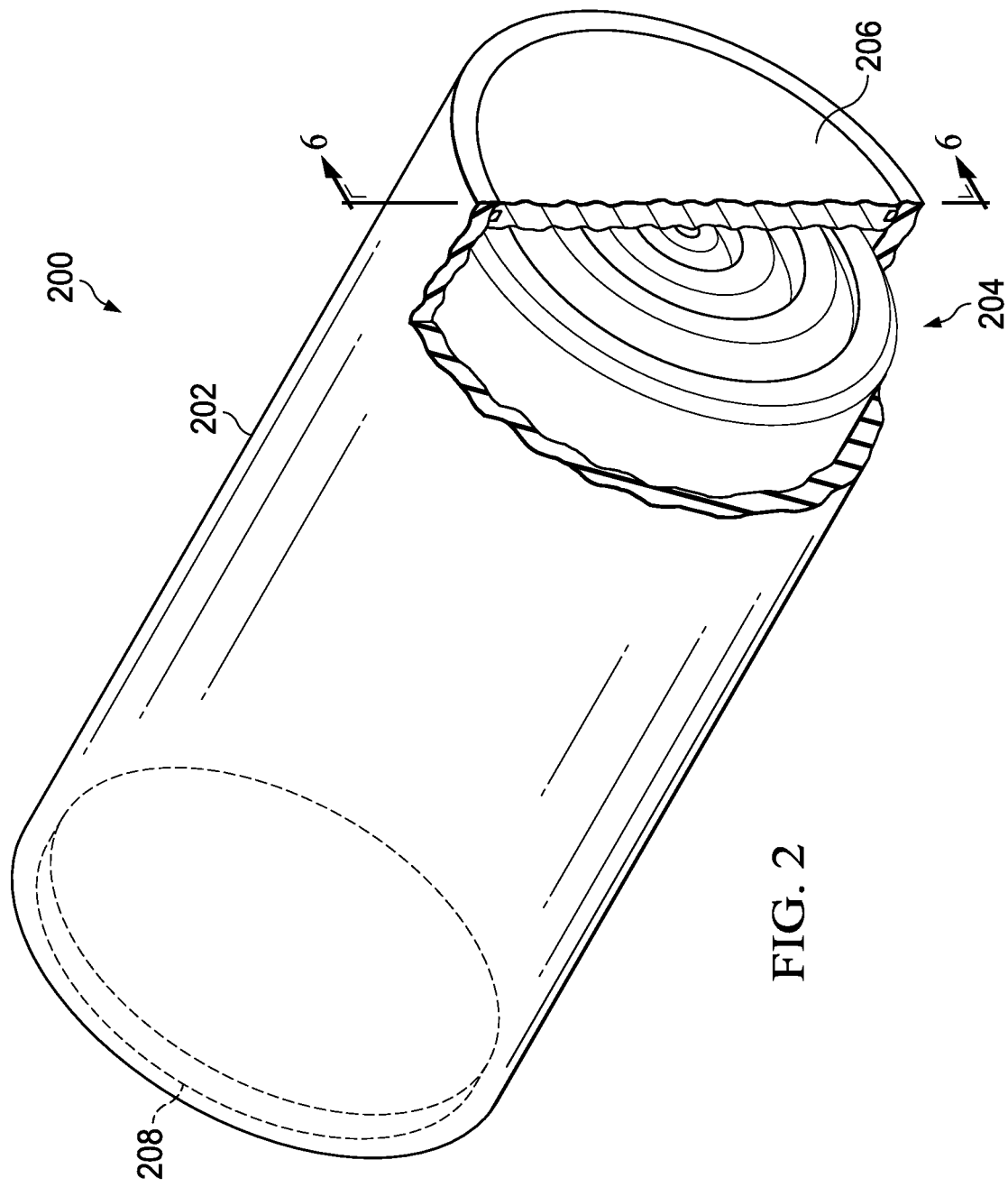
FIG. 2 illustrates an oblique view of a battery of the aircraft of FIG. 1 according to an embodiment of this disclosure with part of the jacket and an end cap removed to show the battery cell.

FIG. 2 illustrates a battery cell assembly 200 according to an embodiment of this disclosure. Battery pack 116 can include one or more batteries 200 to power rotor assembly 110. Battery pack 116 can contain a plurality of batteries 200 connected in series or in parallel to increase the output thereof. Battery 200 has a jacket 202 containing a battery cell 204 and electrode end caps 206, 208. As will be discussed in greater detail below, jacket 202 is made from a non-conductive material. As will be discussed in greater detail below, one of electrode end caps 206, 208 contacts a positive electrode of battery cell 204 and the other one of electrode end caps 206, 208 contacts a negative electrode of battery cell 204. Accordingly, end caps 206, 208 can be electrically connected to a circuit to supply electrical energy to an electronic load of motor 114.

Figure 3:
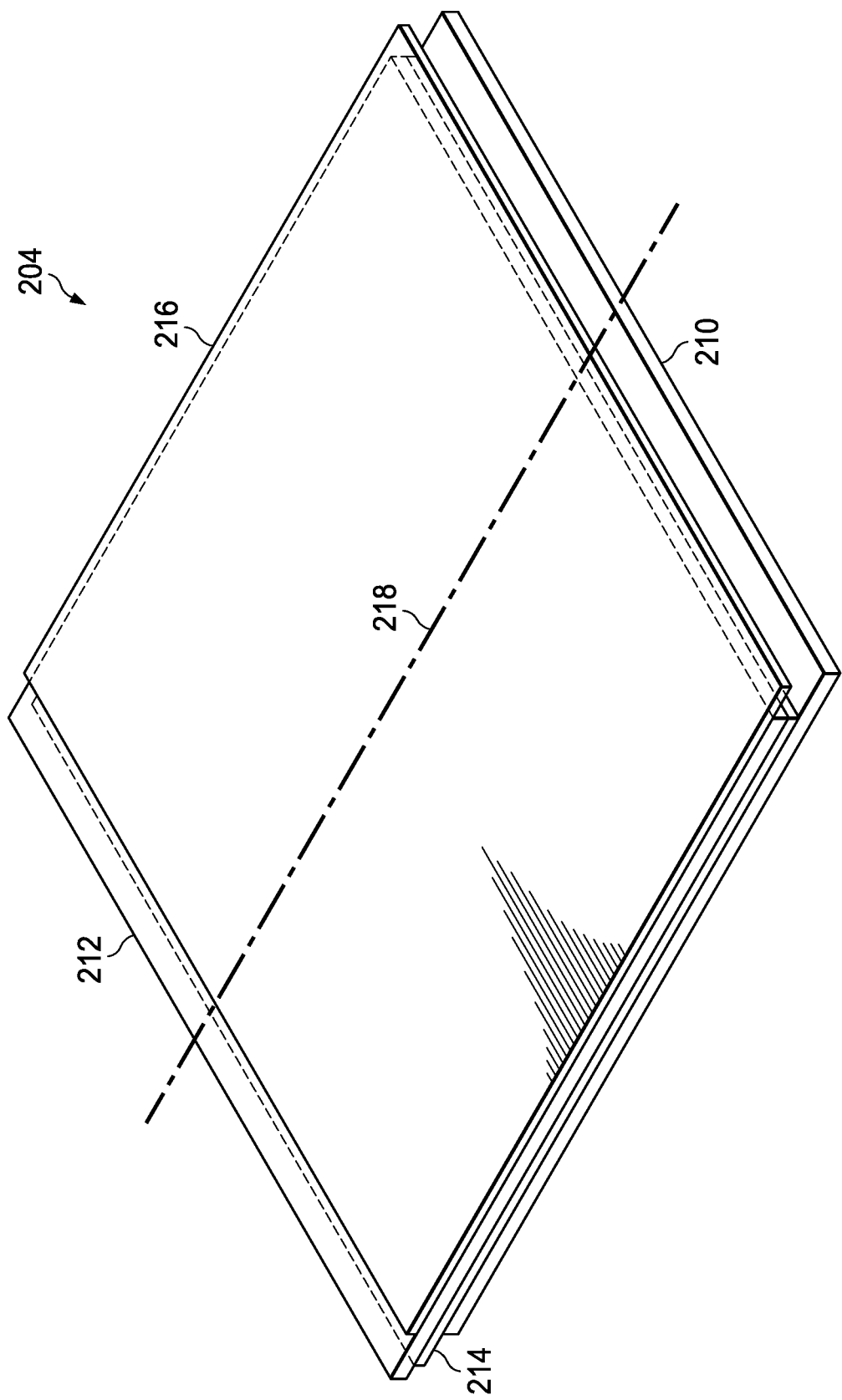
FIG. 3 illustrates an oblique view of a battery cell of the battery of FIG. 2 in an unrolled state.

Battery cell 204 is a cylindrically-shaped battery cell, commonly referred to as a jelly roll design. Referring to FIGS. 3 and 4, battery cell 204 has two electrodes 210, 212, separated by an inner separator 214, and an outer separator 216. Specifically, electrode 210 is a negative electrode, which can also be referred to as an anode, and electrode 212 is a positive electrode, which can also be referred to as a cathode. Cathode 212 can be made of any lithium metal oxide material typically used in lithium-ion batteries, such as, for example, Lithium Cobalt Oxide, Lithium Manganese Oxide, Lithium Iron Phosphate, Lithium Nickel Manganese Cobalt, or Lithium Nickel Cobalt Aluminum Oxide. Anode 210 can be made of any material typically used in lithium-ion batteries, such as, for example, graphite. In some embodiments, battery 200 can be a lithium-silicon battery and can comprise a lithium cathode 212 and a silicon anode 210. In some embodiments, battery 200 can be a lithium-sulfur battery and can comprise a sulfur cathode 212 and a lithium anode 210. Separators 214, 216 are positioned between anode 210 and cathode 212 to prevent electrical shorts, and also prevent dendrite formations from forming between electrodes 210, 212. FIGS. 3 and 4 illustrate the components of battery cell 204 before the various components are wound about axis 218 to form the cylindrically-shaped jelly roll design. After cell 204 is wound to its cylindrical shape, part of outer separator 216 is disposed between anode 210 and cathode 212 (for example, as in FIG. 5). Separators 214, 216 can be made from any material typically used in batteries. In some embodiments, separators 214, 216 can be made from a polymer material, such as, for example, polyethylene or polypropylene.

Referring to FIGS. 4 and 5, the various components of cell 204 are layered to form a primary section 220, an anode extension end 222, and a cathode extension end 224. In primary section 220, anode 210, cathode 212, and both separators 214, 216 overlap in a direction 225 perpendicular to longitudinal axis 218 about which cell 204 is wound. An edge of anode 210 and an edge of outer separator 216 extend from primary section 220 and are disposed in anode extension end 222, while cathode 212 and inner separator 214 do not extend into anode extension end 222. Accordingly, anode 210 and outer separator 216 overlap along direction 225 in anode extension end 222. An edge of cathode 212 and an edge of inner separator 214 extend from primary section 220 and are disposed in cathode extension end 224, while anode 210 and outer separator 216 do not extend into cathode extension end 224. Accordingly, cathode 212 and inner separator 214 overlap along direction 225 in cathode extension end 224.

Although the drawings illustrate that outer separator 216 extends into anode extension end 222 and that inner separator 214 extends into cathode extension end 224, one with skill in the art will recognize that other embodiments are possible. For example, in some embodiments, outer separator 216 extends into cathode extension end 224 and inner separator 214 extends into anode extension end 222. In some embodiments, both separators 214, 216 extend into anode extension end 222 and cathode extension end 224. In some embodiments, neither of the separators 214, 216 extend into either anode extension end 222 or cathode extension end 224.

Figure 6:
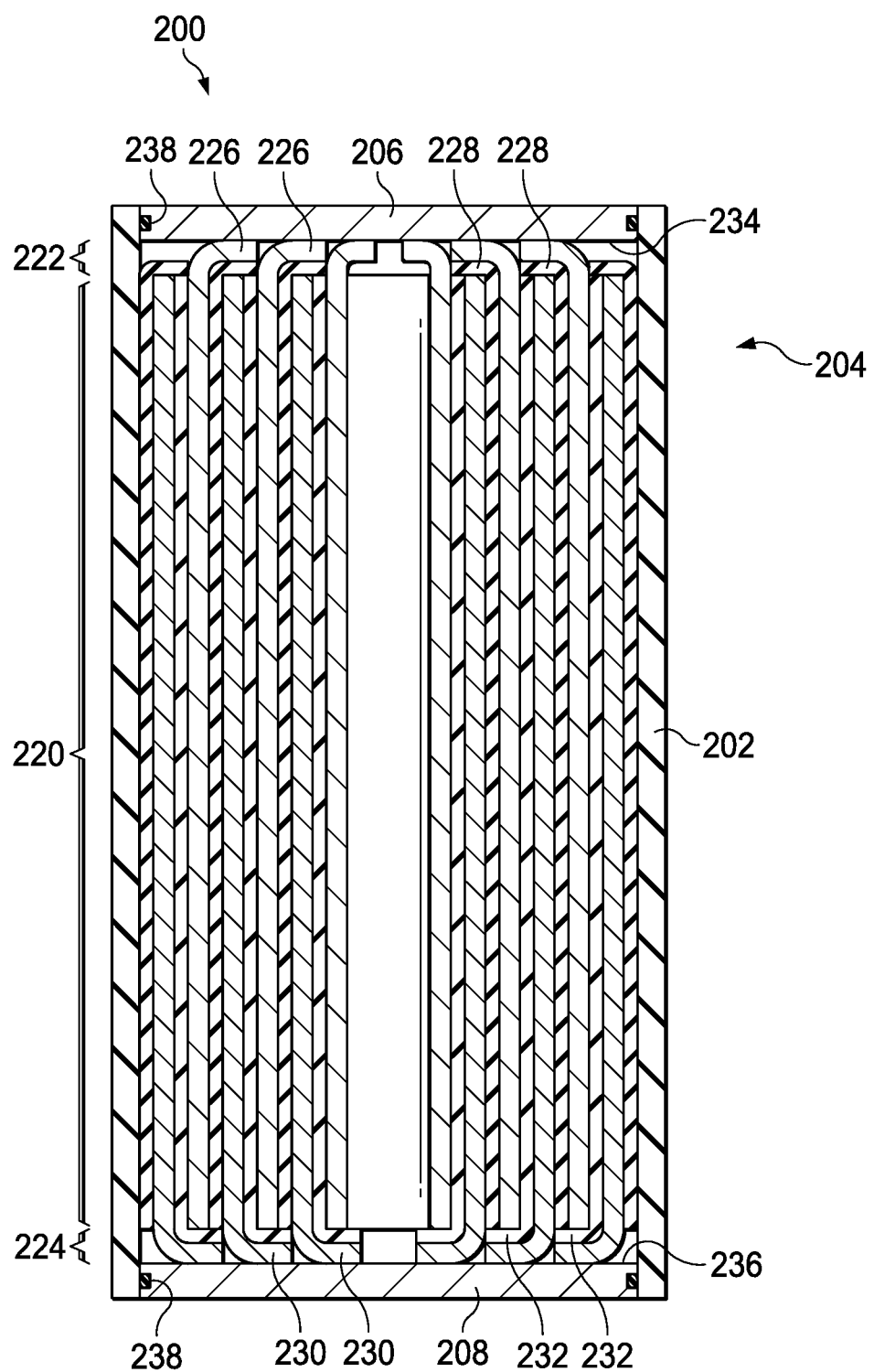
FIG. 6 illustrates a cross-sectional view of the battery of FIG. 2.

Referring to FIG. 6, a cross-sectional view of battery 200 is illustrated. End cap 206 is coupled to anode extension end 222 and thus can be referred to as an anode end cap 206. Similarly, end cap 208 is coupled to cathode extension end 224 and thus can be referred to as a cathode end cap 208. End caps 206, 208 are made from a conductive material, and current can pass between anode end cap 206 and anode 210, and between cathode end cap 208 and cathode 212. Accordingly, end caps 206, 208 can be electrically coupled to a circuit to supply electrical energy to a load of motor 114.

An edge of anode 210 disposed in anode extension end 222 has a plurality of folded portions 226. As illustrated, distal ends of the folded portions 226 can be folded inward, toward axis 218. However, in some embodiments, one or more folded portions 226 are folded outward, away from axis 218. Additionally, an edge of outer separator 216 disposed in anode extension end 222 has a plurality of folded portions 228. Anode folded portion 226 is folded such that a separator folded portion 228 is disposed between the anode folded portion 226 and primary section 220. Specifically, separator folded portion 228 is disposed to prevent contact between anode folded portion 226 and an edge of cathode 212 adjacent to anode extension end 222. As previously discussed, contact between anode 210 and cathode 212 could lead to shorting or dendrite formation, and folded portion 228 is positioned to prevent such contact from occurring. Additionally, anode folded portion 226 can be folded to contact an adjacent portion of anode 210. In some embodiments, a distal edge of anode folded portion 226 contacts an adjacent anode folded portion 226. In some embodiments, an inward-facing surface of folded portion 226 (a surface of folded portion 226 facing primary section 220) contacts an outward facing surface of an adjacent folded portion 226 such that adjacent folded portions 226 overlap along longitudinal axis 218.

Similarly, an edge of cathode 212 disposed in cathode extension end 224 has a plurality of folded portions 230. As illustrated, distal ends of the folded portions 230 can be folded inward, toward axis 218. However, in some embodiments, one or more folded portions 230 are folded outward, away from axis 218. Additionally, an edge of inner separator 214 disposed in cathode extension end 224 has a plurality of folded portions 232. Cathode folded portion 230 is folded such that a separator folded portion 232 is disposed between the cathode folded portion 230 and primary section 220. Specifically, separator folded portion 232 is disposed to prevent contact between cathode folded portion 230 and an edge of anode 210 adjacent to cathode extension end 224. As previously discussed, contact between anode 210 and cathode 212 could lead to shorting or dendrite formation, and folded portion 232 is positioned to prevent such contact from occurring. Additionally, cathode folded portion 230 can be folded to contact an adjacent portion of cathode 212. In some embodiments, a distal edge of cathode folded portion 230 contacts an adjacent cathode folded portion 230. In some embodiments, an inward-facing surface of folded portion 230 (a surface of folded portion 230 facing primary section 220) contacts an outward facing surface of an adjacent folded portion 230 such that adjacent folded portions 230 overlap along longitudinal axis 218.

In some embodiments, the edge of electrode 210, 212 disposed in extension end 222, 224 may incorporate slits substantially parallel with longitudinal axis 218 to further define folded portions 226, 230. However, in other embodiments, folded portions 226, 230 are folded without the use of the described slits. That is to say, in some embodiments, the edge of electrode 210, 212 disposed in extension end 222, 224 is a continuous piece of material.

Folded portions 226, 230 increase the geometrical contact surface area between each electrode 210, 212 and its respective end cap 206, 208. Current transfer between each electrode 210, 212 and its respective end cap 206, 208 is improved due to the increase of contact surface area. Heat transfer of battery 200 is also improved due to current efficiently being transferred between the electrode 210, 212 and its respective end caps 206, 208. In some embodiments, folded portions 226, 230 form a generally circular surface area through which current can travel between electrode 210, 212 and end cap 206, 208.

In some embodiments, surface treatment processes can be applied to end caps 206, 208 and/or folded portions 226, 230 to further increase the contact surface area through which current can travel. Surfaces of folded portions 226, 230 and/or inner surface 234, 236 can be surfaces that have undergone a subtractive surface treatment process or an additive treatment process to increase the surface area through which current can transfer. Subtractive surface treatment processes increase conductive surface area by removing part of the processed surface. An example of subtractive surface treatment processes is acid etching, which removes material from the processed surface area at the nano level and thus increases the surface area through which a current can pass. When folded portion 226, 230 and/or inner surface 234, 236 are acid etched surfaces, the total contact surface area between the folded portion 226, 230 and its respective end cap 206, 208 through which current can pass is even greater than the geometrical surface area, and, thus, current transfer and heat transfer is further improved.

Additive surface treatment processes increase conductive surface area by adding material to the processed surface. After applied, the additive material can have a surface with more irregularities at the nano level than the surface to which it was applied, thus increasing the surface area through which a current can pass. When folded portions 226, 230 and/or inner surfaces 234, 236 are subjected to an additive surface treatment process, the total contact surface area between the folded portion 226, 230 and its respective end cap 206, 208 through which current can pass is even greater than the geometrical surface area, and, thus, current transfer and heat transfer is further improved. Additive surface treatments can be performed using any of a variety of suitable processes, such as, for example, electroplating.

In some embodiments folded portions 226, 230 and/or inner surfaces 234, 236 are subjected to both an additive surface treatment process and a subtractive surface treatment process. For example, a material can be added to folded portion 226, 230 and/or inner surface 234, 236 using an additive surface treatment process and then part of the added material can be taken away using a subtractive surface treatment process.

Previous battery designs have incorporated small tabs extending from the electrodes to transfer current between the electrodes and the electric load applied to the battery. The tabs provide a relatively small cross-sectional area through which current must pass. Because direct current is passed through the entire cross-sectional area of a conductive path, a reduction in the cross-sectional area tends to generate a greater amount of heat. Accordingly, the current density and localized heating in such previous battery designs is highest through the tabs. In some high-power and energy-dense batteries, hot spots form at and around the tabs due to the tabs not being able to efficiently transfer the amount of current provided to the load. Instead of tabs, battery 200 incorporates folded portion 226, 230 to transfer current between electrode 210, 212 and end cap 206, 208. The increased contact surface area between folded portion 226, 230 and end cap 206, 208, discussed in detail above, allows for uniform and efficient current flow between electrode 210, 212 and end cap 206, 208 and prevents significant hot spots from forming in battery 200. Accordingly, battery 200 is significantly more thermally efficient than previous designs.

As previously mentioned, jacket 202 is comprised of a non-conductive material. In some embodiments, such as illustrated in FIGS. 1 and 6, jacket 202 can be a flexible tape or wrap that is wrapped around cell 204 and end caps 206, 208 to couple end caps 206, 208 to cell 204. Specifically, in some embodiments, jacket 202 is a flexible polymer that is wrapped around cell 204 and endcaps 206, 208. The flexible polymer can be made from any of a number of suitable polymers, such as, for example, PTFE. End caps 206, 208 can further comprise a polyolefin rubber o-ring 238 configured to seal a space between end cap 206, 208 and jacket 202. Battery 200 comprises an electrolyte fluid, and o-ring 238 is configured to seal a space between end cap 206, 208 and jacket 202 to seal the electrolyte fluid with an interior of jacket 202.

Figure 7:
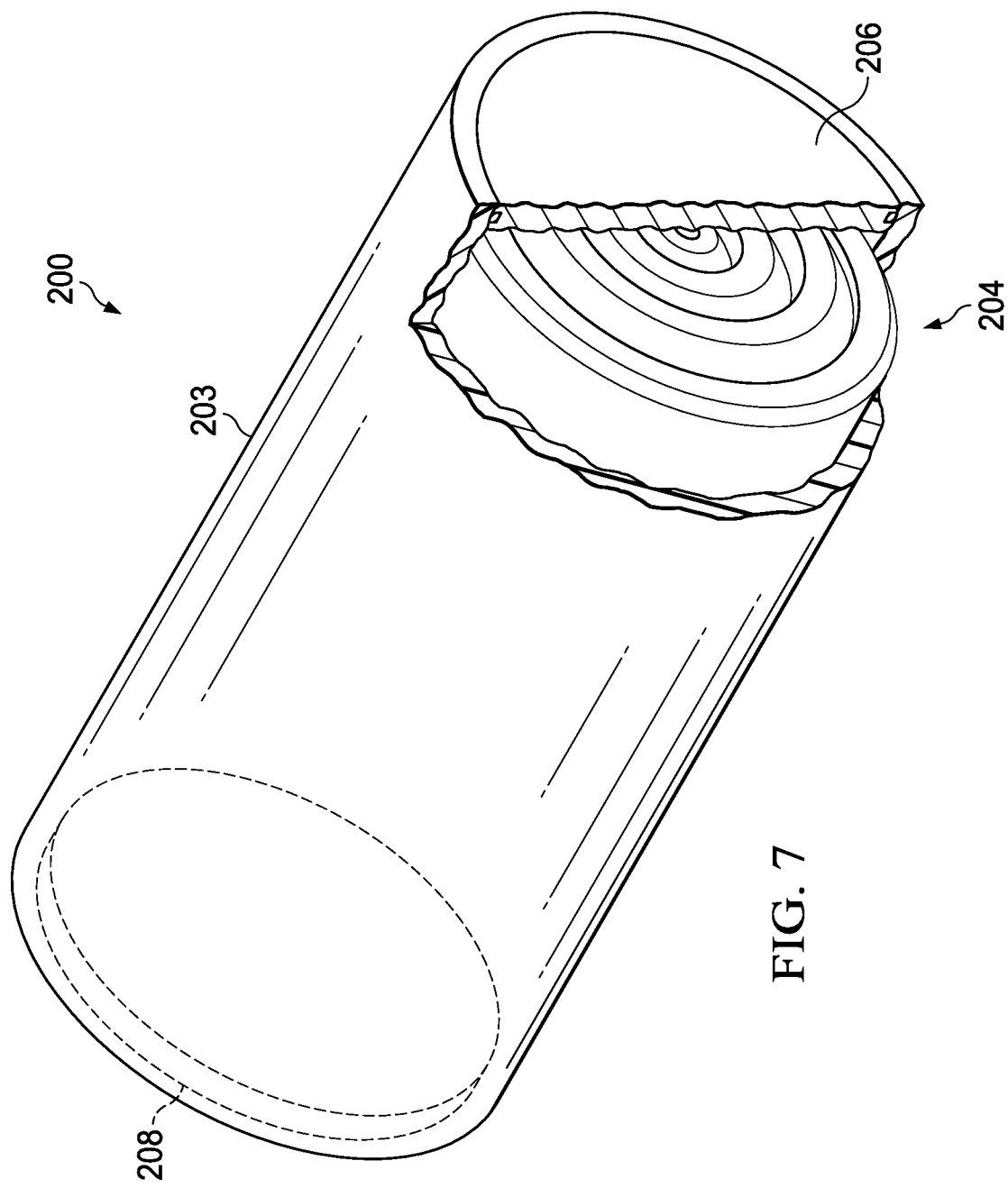
FIG. 7 illustrates an oblique view of a battery of the aircraft of FIG. 1 according to another embodiment of this disclosure with part of the jacket and an end cap removed to show the battery cell.

Referring to FIG. 7, in some embodiments, battery 200 has a rigid jacket 203 that can be a rigid tube made from a non-conductive material. In some embodiments, jacket 203 can be a rigid tube made from a polymer such as, for example, PVC or HDPE. O-ring 238 is configured to seal a space between end cap 206, 208 and jacket 203 to seal the electrolyte fluid within an interior of jacket 203.

Figure 8:
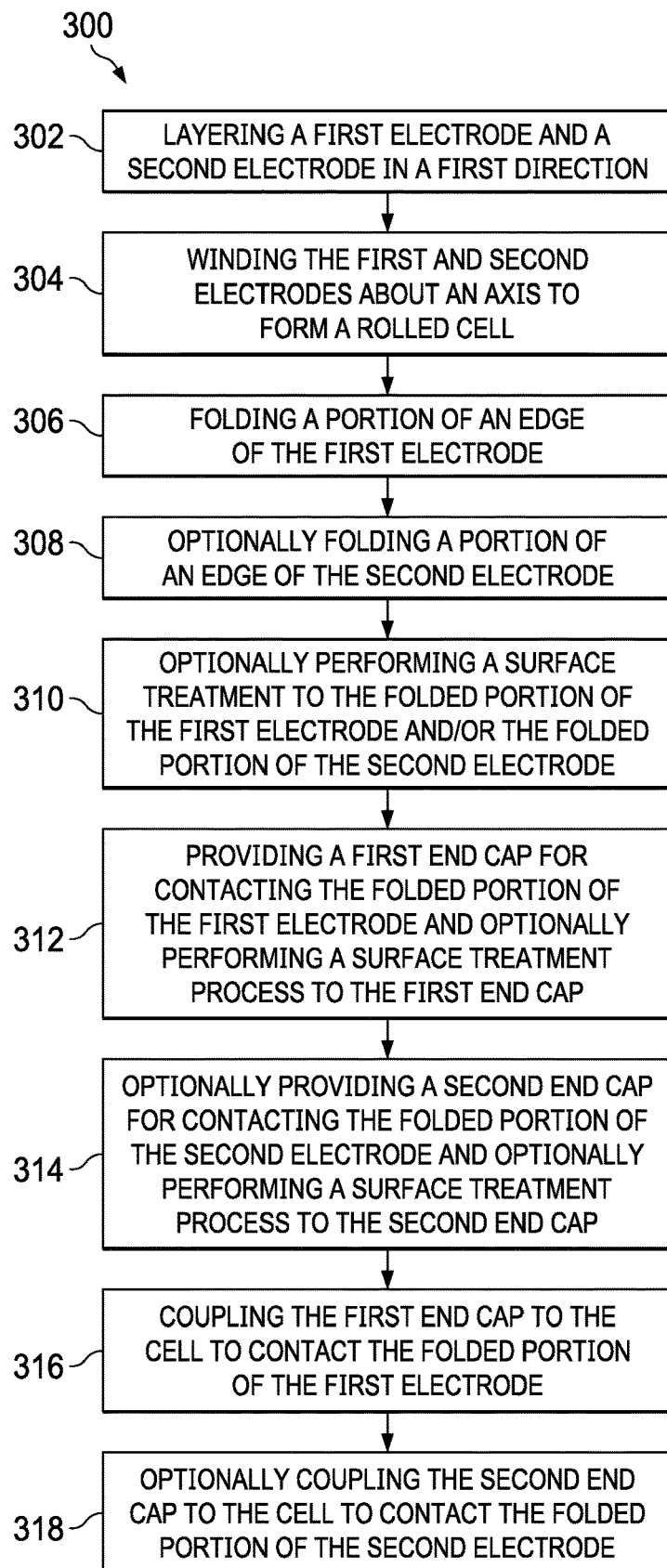
FIG. 8 is a flowchart illustrating a method of assembling a battery according to an embodiment of this disclosure.

Referring to FIG. 8, a method 300 of assembling battery 200 is described. Method 300 can begin at block 302 by layering a first and a second electrode in a first direction. For example, the first electrode can be anode 210 and the second electrode can be cathode 212 layered in direction 225, as described in FIGS. 3 and 4. The electrodes 210, 212 can be layered to form anode extension end 222 and cathode extension end 224. Method 300 can continue at block 304 by winding first and second electrodes 210, 212 about axis 218 to form rolled cell 204.

Method 300 can continue at block 306 by folding a portion of an edge of the first electrode. In method 300, the first electrode will be described as anode 210 and the second electrode will be described as cathode 212, although one with skill in the art will recognize that the alternative is another embodiment. Accordingly, at block 306, anode folded portion 226 and separator folded portion 228 can be folded. Method 300 can optionally continue at block 308 by folding cathode folded portion 230 and separator folded portion 232. One with skill in the art will understand that folding of folded portions 226, 230 can be performed using any of a number of processes. For example, in some embodiments, a person or machine can fold folded portion 226, 230 by pressing the folded portion 226, 230 along axis 218 toward primary section 220. In some embodiments, end caps 206, 208 can be used to fold folded portions 226, 230. For example, a machine or person can press end cap 206, 208 against folded portion 226, 230 along axis 218 toward primary section 220 to fold folded portion 226, 230 toward primary section 220.

Method 300 can continue at block 310 by optionally performing a surface treatment process to anode folded portion 226. The surface treatment process can be applied to one or all surfaces of folded portion 226. The surface treatment process can be a process that increases the surface area of folded portion 226, such as the additive and/or subtractive surface treatment processes previously described. Optionally, a surface treatment process may also be applied to cathode folded portion 230, and can be applied in a same or a substantially similar manner as what has been previously described. One with skill in the art will recognize that the surface treatment process is not limited to being performed after the cell 204 is rolled or after folded portion 226 is folded. For example, in some embodiments, the surface treatment process can be applied to folded portion 226, 230 before electrodes 210, 212 are layered in block 302.

Method 300 can continue at block 312 by providing a first end cap for contacting the first electrode, such as anode end cap 206 which contacts anode folded portion 226. Optionally, a surface treatment process can be applied to inner surface 234 of end cap 206, which contacts folded portion 226. The surface treatment process can be a process that increases the surfaces area of inner surface 234, such as the additive or subtractive surface treatment processes previously described. Method 300 can optionally continue at block 314 by providing cathode end cap 208 for contacting cathode folded portion 230. As describe with anode end cap 206, optionally, a surface treatment process can be applied to an inner surface 236 of end cap 208 to increase the surface area of inner surface 236, such as the additive or subtractive surface treatment processes previously described.

Method 300 can continue at block 316 by coupling anode end cap 206 to cell 204 to contact folded portion 226, such as, for example, with jacket 202 or 203. Method 300 can optionally continue at block 318 by coupling cathode end cap 208 to cell 204 to contact cathode folded portion 230, such as, for example, with jacket 202 or 203.

Figure 9:
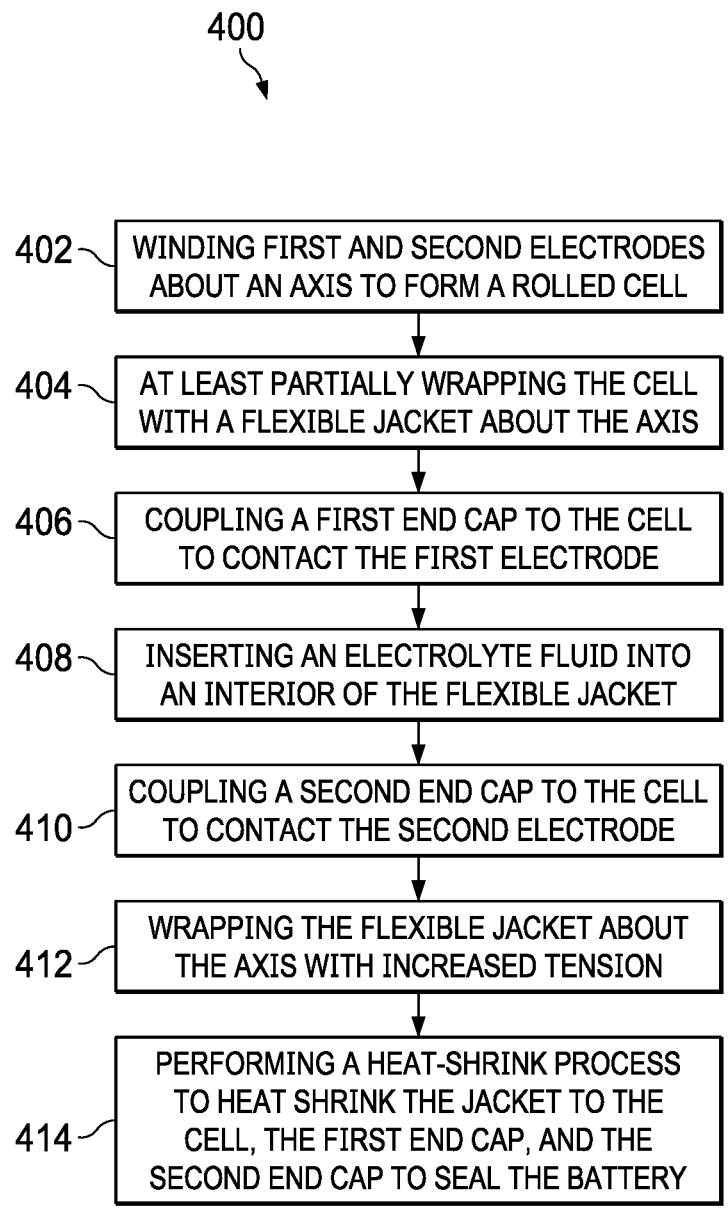
FIG. 9 is a flowchart illustrating a method of assembling a battery with a flexible jacket according to an embodiment of this disclosure.

Referring to FIG. 9, a method of assembling a battery 200 with a flexible jacket 202 will be described. Method 400 can begin at block 402 by winding first and second electrodes 210, 212 about an axis 218 to form a rolled cell 204. For example, cell 204 can be formed by the methods and process discussed in method 300. For method 400, the first electrode will be described as anode 210 and the second electrode will be described as cathode 212, although one with skill in the art will recognize that the alternative is another embodiment.

Method 400 can continue at block 404 by at least partially wrapping flexible jacket 202 around an outer circumferential surface of cell 204 about axis 218. For example, flexible jacket 202 can be coupled to outer separator 216 and wrapped about axis 218 to at least partially cover the outer circumferential surface of outer separator 216. As previously discussed, flexible jacket 202 can be a flexible polymer made from any of a number of suitable polymers, such as, for example, PTFE.

Method 400 can continue at block 406 by coupling first end cap 206 to contact first electrode folded portion 226. For example, flexible jacket 202 can be wrapped around end cap 206 and cell 204 to hold end cap 206 against folded portion 226.

Method 400 can continue at block 408 by inserting an electrolyte fluid into an interior of jacket 202. For example, jacket 202 can be wrapped around cell 204 to form a generally cylindrical shape, and the electrolyte fluid can be inserted into the interior of the cylindrically-shaped jacket 202.

Method 400 can continue at block 410 by coupling second end cap 208 to a second end of cell 204 to contact second electrode folded portion 230. For example, flexible jacket 202 can be wrapped around end cap 208 and cell 204 to hold end cap 208 against folded portion 230.

Method 400 can continue at block 412 by wrapping flexible jacket 202 around cell 204 about axis 218. Optionally, the wrapping in block 412 can be performed with an increased tension, to more tightly wrap jacket 202 around cell 204, than the wrapping performed at block 404.

Method 400 can continue at block 414 by performing a heat-shrink process to flexible jacket 202. Battery 200 can be heated so that flexible jacket 202 shrinks to tightly form around cell 204 and end caps 206, 208 to couple the components together. The heat-shrink process causes jacket 202 to tightly seal with o-rings 238 of end caps 206, 208 against jacket 202 to seal the electrolyte fluid within an interior of jacket 202. In some embodiment, battery 200 can be disposed in a heat-shrink tube which heats battery 200 to shrink jacket 202 as previously described.

Figure 10:
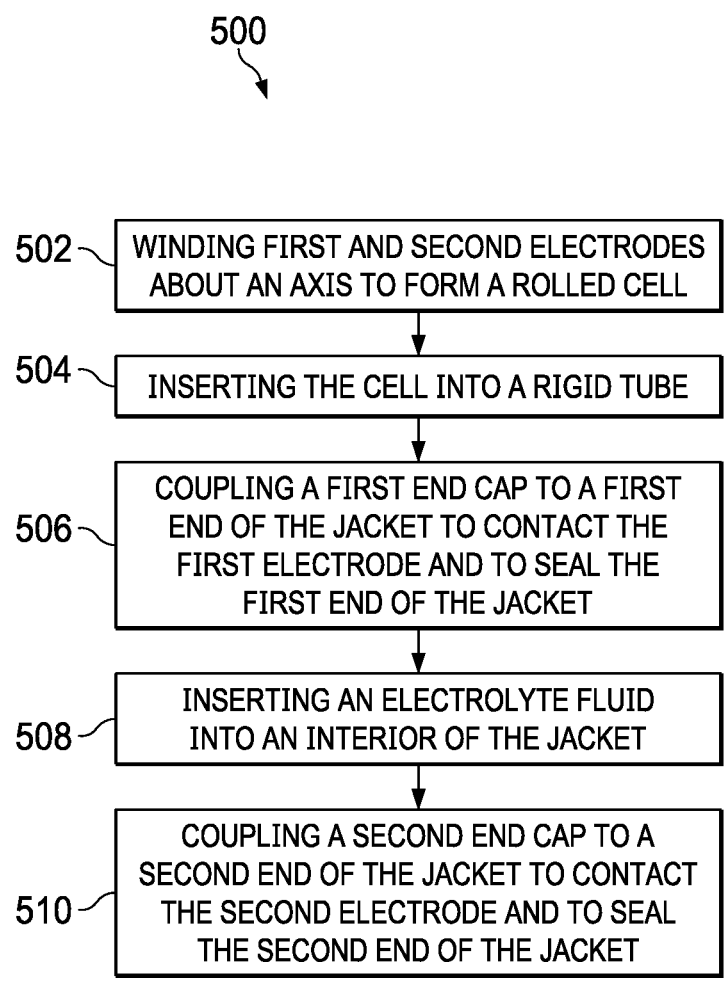
FIG. 10 is a flowchart illustrating a method of assembling a battery with a rigid jacket according to an embodiment of this disclosure.

Referring to FIG. 10, a method of assembling a battery 200 with a rigid jacket 203 will be described. Method 500 can begin at block 502 by winding first and second electrodes 210, 212 about an axis 218 to form a rolled cell 204. For example, cell 204 can be formed by the processes and methods discussed in methods 300. For method 500, the first electrode will be described as anode 210 and the second electrode will be described as cathode 212, although one with skill in the art will recognize that the alternative is another embodiment.

Method 500 can continue at block 504 by inserting cell 204 into jacket 203. As previously discussed, flexible jacket 202 can be a rigid, cylindrically-shaped tube made from a non-conductive material. In some embodiments, jacket 203 can be a rigid tube made from a polymer, such as, for example, PVC or HDPE.

Method 500 can continue at block 506 by coupling first end cap 206 to a first end of jacket 203 to contact first electrode 210 and to seal the first end of jacket 203. As illustrated in FIG. 7, cylindrically-shaped first end cap 206 can be inserted into a first end of jacket 203 to contact first electrode folded portion 226. In some embodiments, o-ring 238 of end cap 206 has a larger outer diameter than an inner diameter of the opening of jacket 203, and insertion of end cap 206 into jacket 203 compresses o-ring 238 such that o-ring 238 seals a space between the outer circumferential surface of end cap 206 and the inner circumferential surface of jacket 203. Method 500 can continue at block 508 by inserting an electrolyte fluid into an interior of jacket 203.

Method 500 can continue at block 510 by coupling second end cap 208 to a second end of jacket 203 to contact second electrode 212 and to seal the second end of jacket 203. As illustrated in FIG. 7, cylindrically-shaped second end cap 208 can be inserted into a first end of jacket 203 to contact second electrode folded portion 230. In some embodiments, o-ring 238 of end cap 208 has a larger outer diameter than an inner diameter of the opening of jacket 203, and insertion of end cap 208 into jacket 203 compresses o-ring 238 such that o-ring 238 seals a space between the outer circumferential surface of end cap 208 and the inner circumferential surface of jacket 203.

One with skill in the art will understand that, according to various embodiments of this disclosure, portions of methods 300, 400, and/or 500 can be combined to assemble battery 200 of this disclosure.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed is:

1. A method of assembling a battery cell assembly, comprising:
   layering a first electrode with a second electrode in a first direction such that a primary section of the first and second electrodes overlap in the first direction and a first edge section of the first electrode does not overlap with the second electrode in the first direction;

winding the first and second electrodes about an axis perpendicular to the first direction to form a cylindrically-shaped rolled cell with the first edge section disposed on a first end of the rolled cell;

folding a first folded portion of the first edge section to contact an adjacent portion of the first edge section; and coupling a first end cap to the rolled cell to contact the first folded portion.

2. The method of claim 1, further comprising performing a subtractive surface treatment to a surface of the first folded portion that contacts the first end cap.

3. The method of claim 1, further comprising performing a subtractive surface treatment to a surface of the first end cap that contacts the first folded portion.

4. The method of claim 1, wherein the layering further comprises layering a separator between the first electrode and the second electrode in the first direction.

5. The method of claim 1, wherein the layering further comprises layering a separator between the first electrode and the second electrode in the first direction such that an edge section of the separator at least partially overlaps with the first edge section in the first direction and does not overlap with the second electrode in the first direction.

6. The method of claim 5, wherein the folding further comprises folding the first folded portion such that a folded portion of the edge section of the separator is disposed between the first folded portion and a primary section of the rolled cell.

7. The method of claim 1, wherein:
the layering further comprises layering the first electrode and the second electrode such that a second edge section of the second electrode does not overlap with the first electrode in the first direction;
the winding forms the rolled cell with the second edge section disposed on a second end of the rolled cell; and
the method further comprises:
folding a second folded portion of the second edge section to contact an adjacent portion of the second edge section; and
coupling a second end cap to the rolled cell to contact the second folded portion.

8. The method of claim 1, wherein the coupling further comprises coupling the first end cap to the rolled cell with a jacket comprised of a non-conductive material.

9. The method of claim 1, further comprising performing an additive surface treatment to a surface of the first folded portion that contacts the first end cap.

10. The method of claim 1, further comprising performing an additive surface treatment to a surface of the first end cap that contacts the first folded portion.

11. A method of constructing a battery cell assembly, comprising:
rolling a first electrode and a second electrode together about a longitudinal axis to form a rolled cell wherein the first electrode and the second electrode overlap in a radial direction from the longitudinal axis and wherein a first extension end extends from a first longitudinal end of the primary section and is formed from a first edge section of the first electrode, and wherein the first edge section comprises a first folded portion folded to contact an adjacent portion of the first edge section;
providing a first end cap coupled to the rolled cell, the first end cap contacting the first folded portion;
providing a second end cap;
disposing a jacket between the first end cap and the second end cap;
wherein the first end cap, the second end cap, and the jacket are sealed to form an interior space; and
preventing fluid from entering the interior space and preventing fluid from exiting the interior space.

12. A method of constructing a battery cell assembly, comprising:
rolling a first electrode and a second electrode together about a longitudinal axis to form a rolled cell, the rolled cell having a primary section in which the first electrode and the second electrode overlap in a radial direction from the longitudinal axis, and a first extension end extending from a first longitudinal end of the primary section and formed from a first edge section of the first electrode, wherein the first edge section comprises a first folded portion folded to contact an adjacent portion of the first edge section;
coupling a first end cap to the rolled cell and contacting the first folded portion;
coupling a second end cap coupled to the rolled cell and contacting the second electrode; and
disposing a tubular jacket between the first end cap and the second end cap, the jacket comprising an opening for receiving the first end cap or the second end cap.

13. The method of claim 12, wherein the rolled cell is longitudinally compressed between the first end cap and the second end cap.

* * * * *